H. G. DORSEY AND A. C. KIRSHNER.
CREDIT SLIP AUTHORIZING APPARATUS.
APPLICATION FILED MAR. 2, 1916.

1,321,900.

Patented Nov. 18, 1919.
12 SHEETS—SHEET 1.

Inventors
HERBERT G. DORSEY
ARTHUR C. KIRSHNER

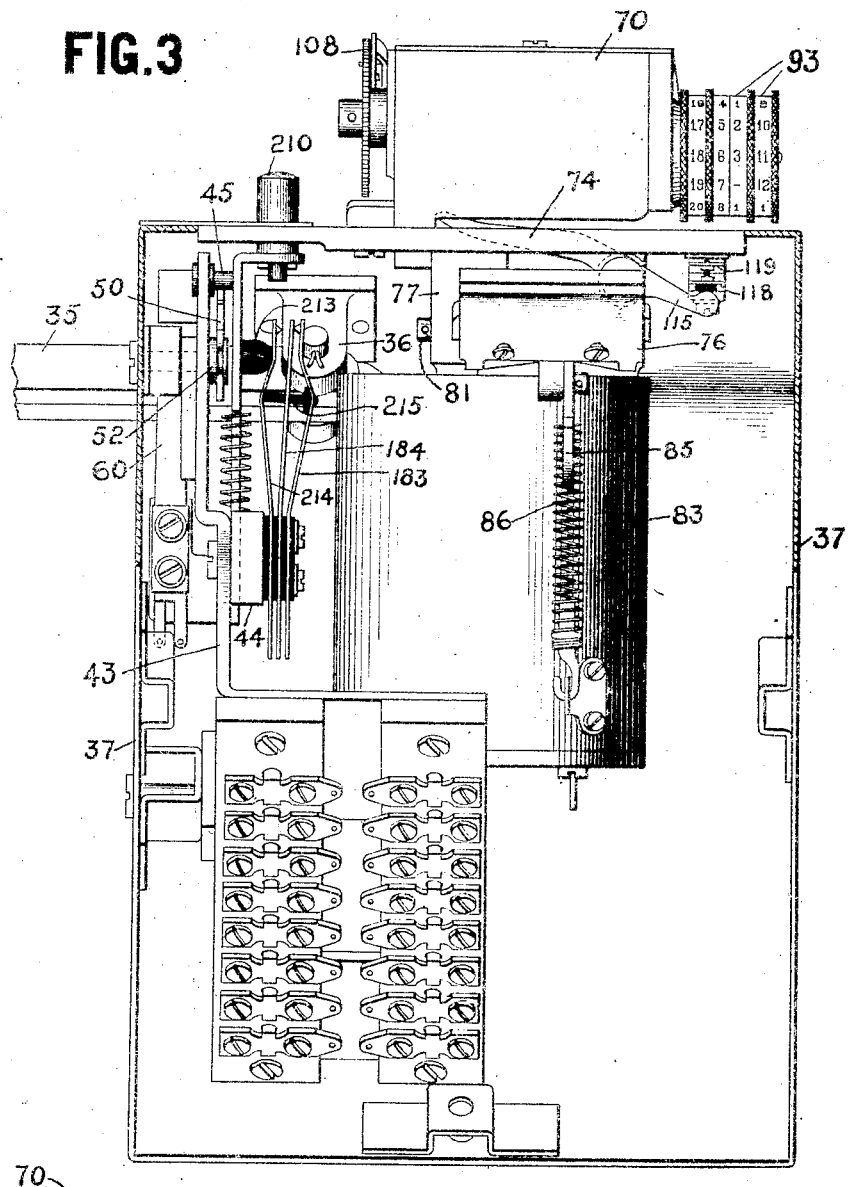

H. G. DORSEY AND A. C. KIRSHNER.
CREDIT SLIP AUTHORIZING APPARATUS.
APPLICATION FILED MAR. 2, 1916.

1,321,900.

Patented Nov. 18, 1919.
12 SHEETS—SHEET 3.

Inventors
HERBERT G. DORSEY
ARTHUR C. KIRSHNER

H. G. DORSEY AND A. C. KIRSHNER.
CREDIT SLIP AUTHORIZING APPARATUS.
APPLICATION FILED MAR. 2, 1916.

1,321,900.

Patented Nov. 18, 1919.
12 SHEETS—SHEET 6.

Inventors
HERBERT G. DORSEY
ARTHUR C. KIRSHNER
by Rchrass
Carl Beust
Attorneys

H. G. DORSEY AND A. C. KIRSHNER.
CREDIT SLIP AUTHORIZING APPARATUS.
APPLICATION FILED MAR. 2, 1916.
1,321,900.
Patented Nov. 18, 1919.
12 SHEETS—SHEET 7.
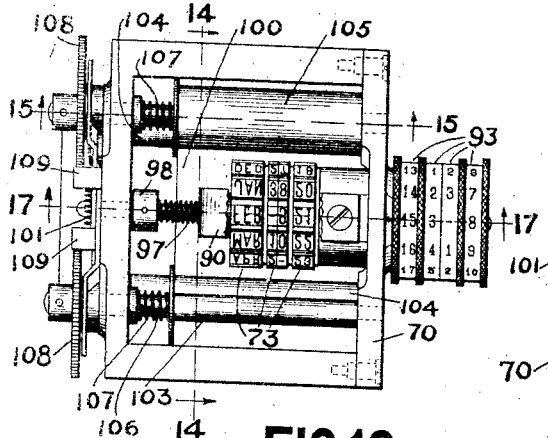
FIG.12
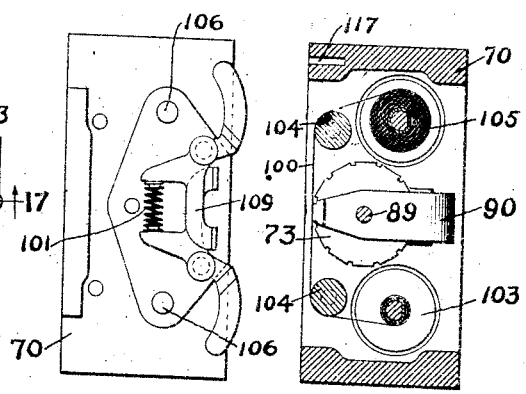
FIG.13     FIG.14
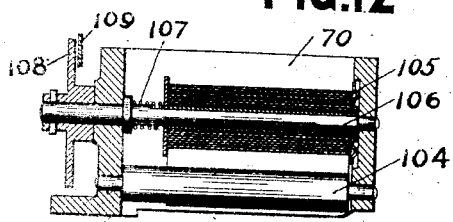
FIG.15
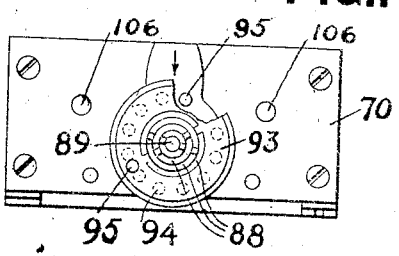
FIG.16
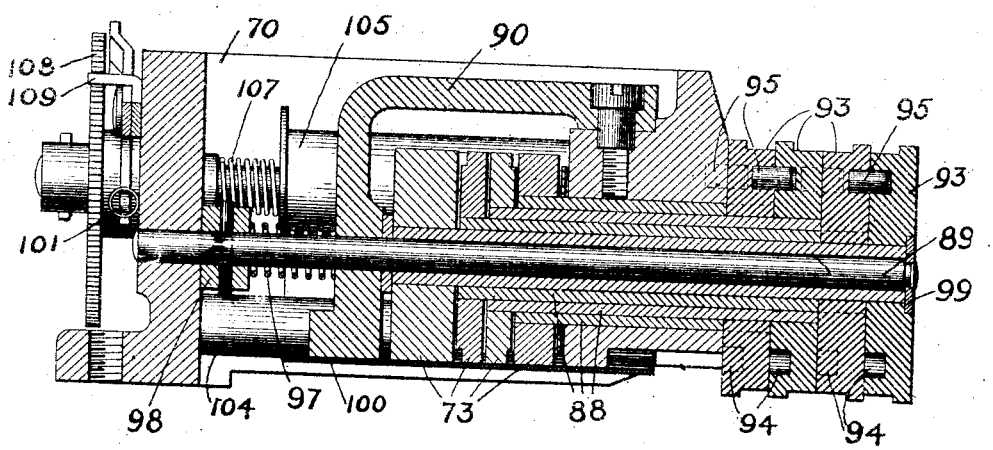
FIG.17
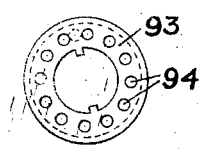
FIG.18
Inventors
HERBERT G. DORSEY
ARTHUR C. KIRSHNER
Attorneys

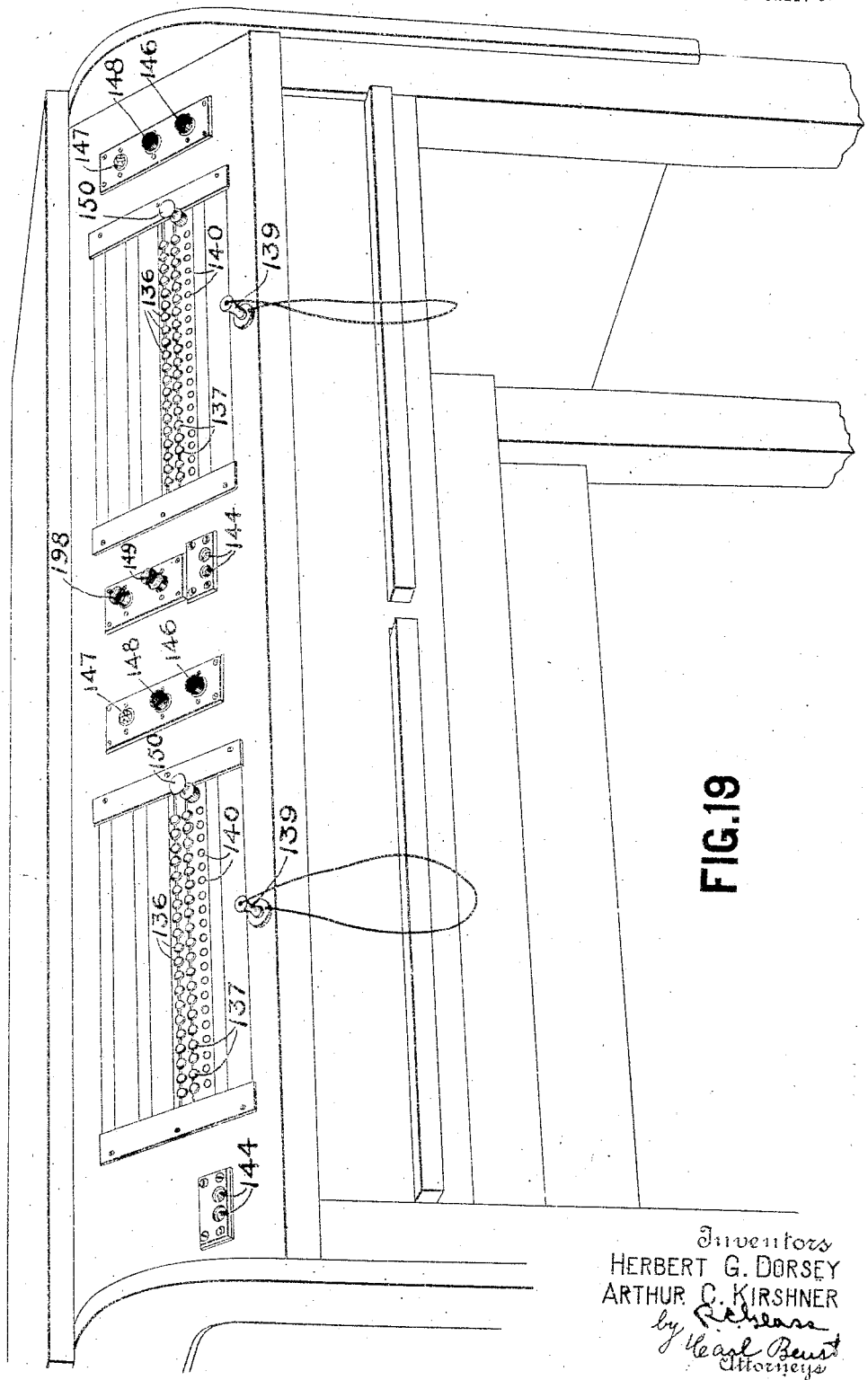

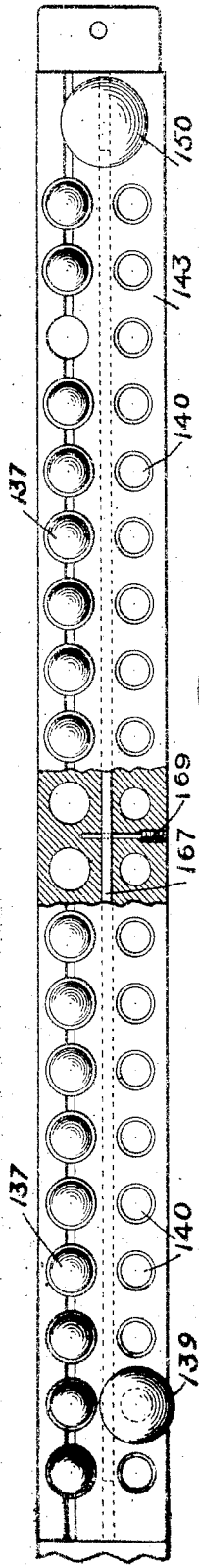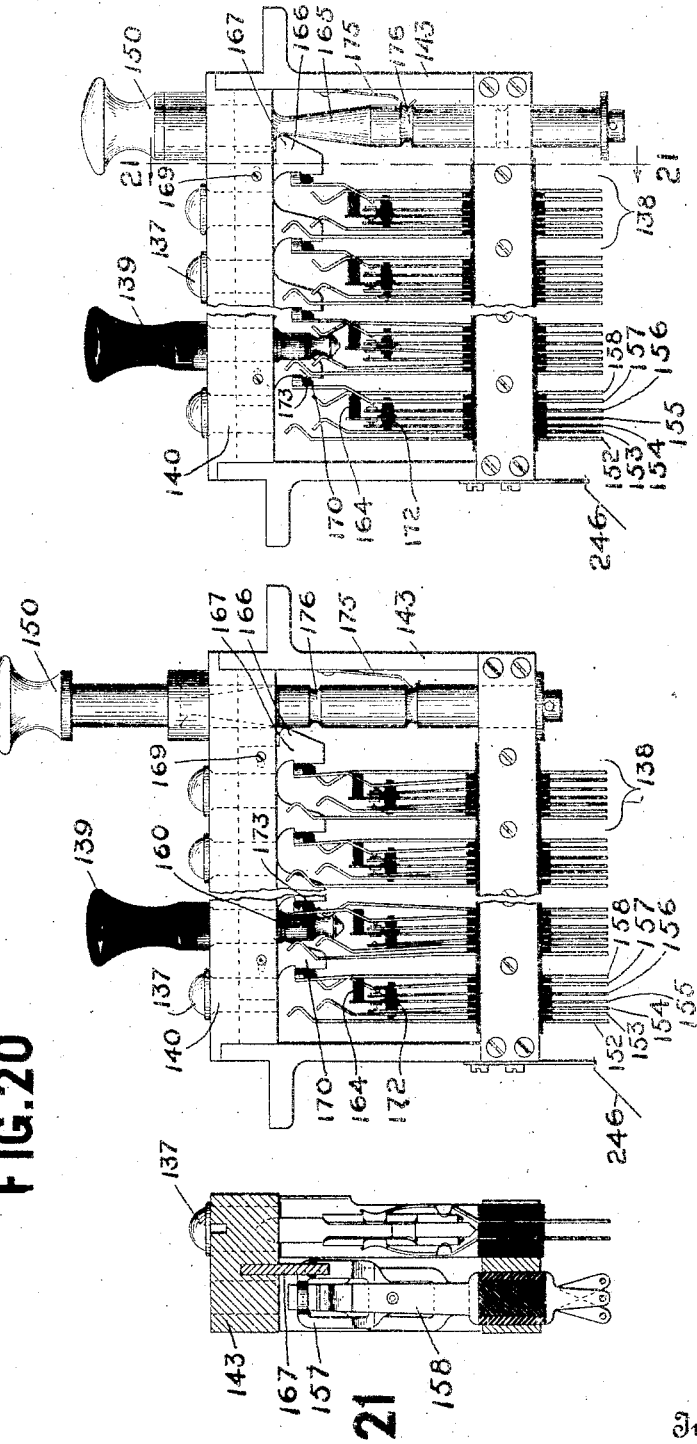

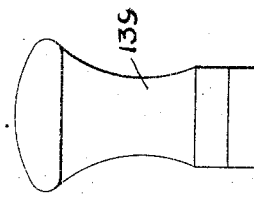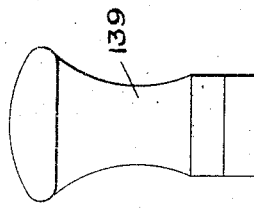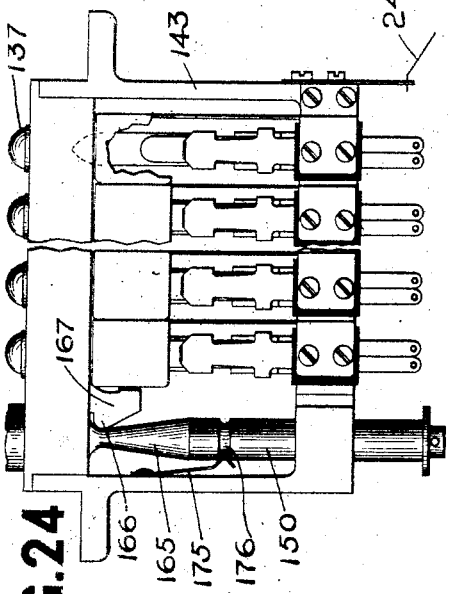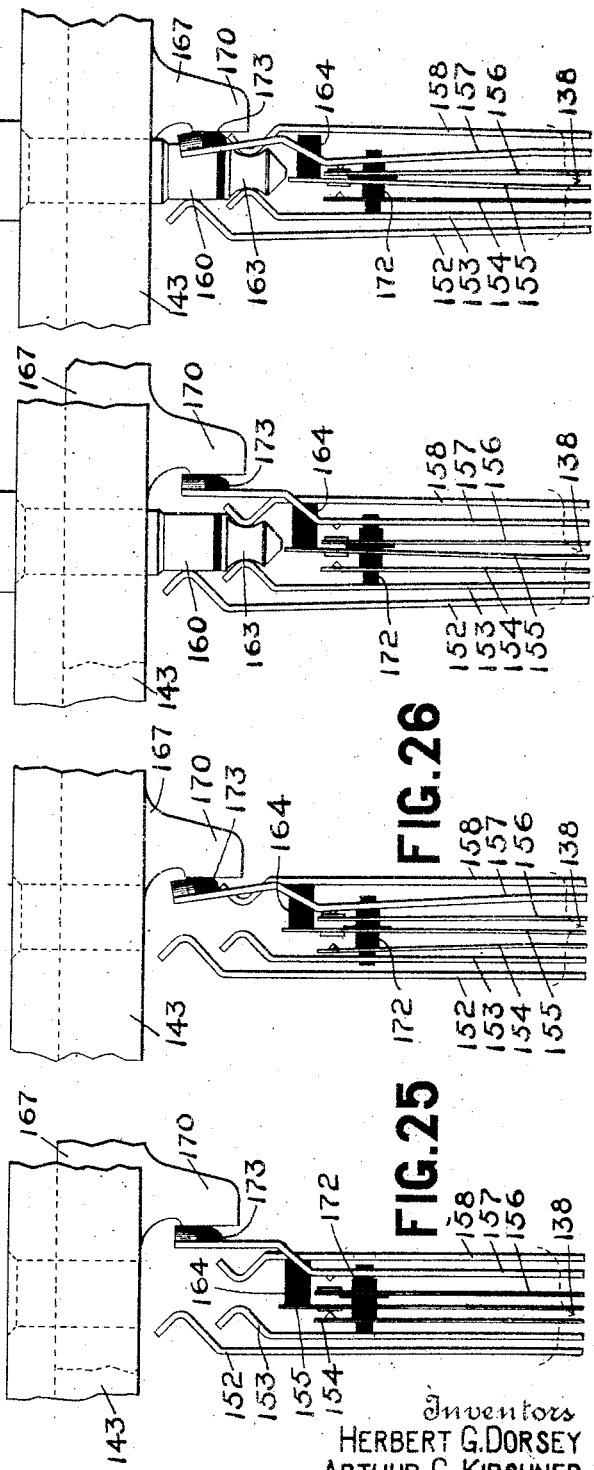

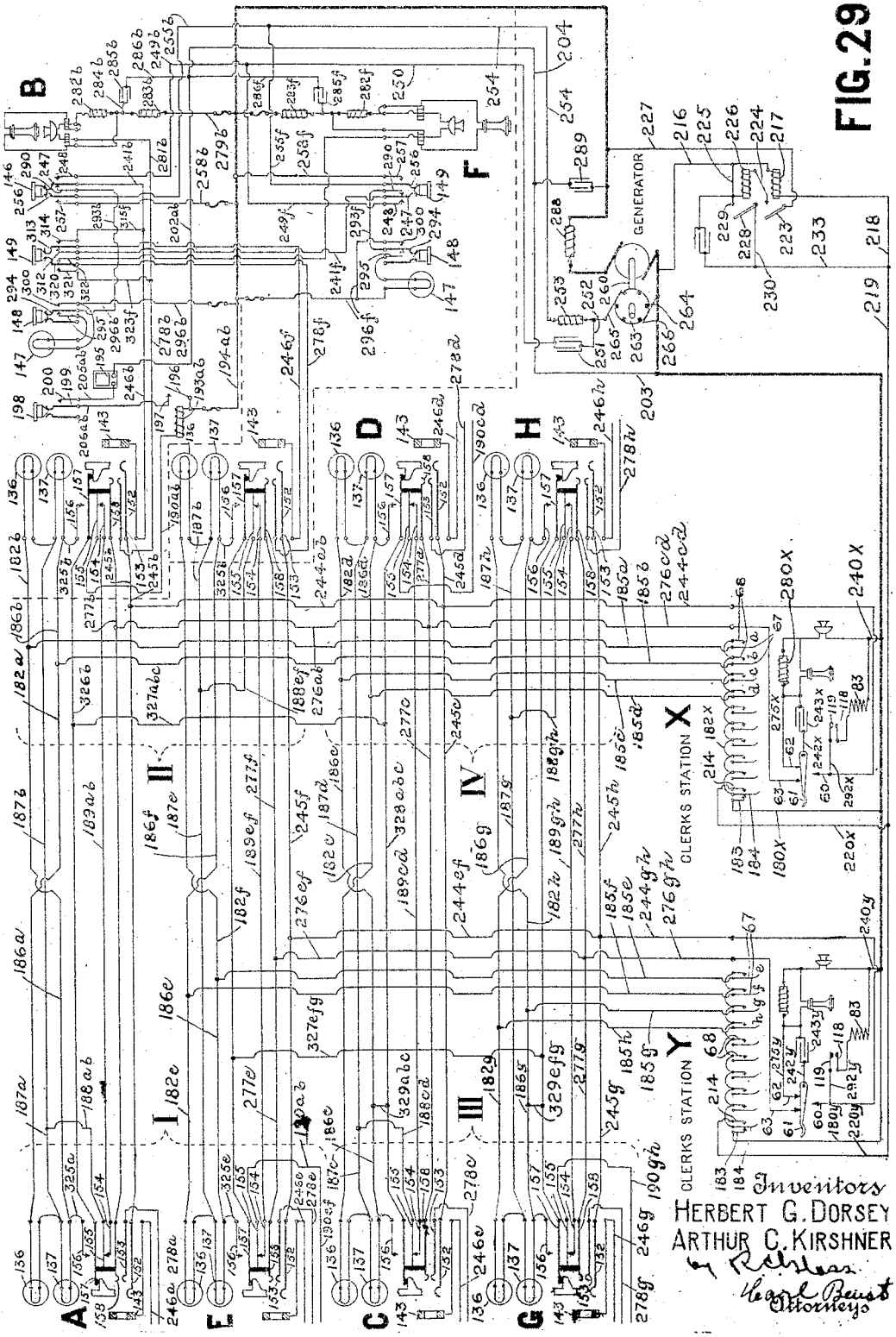

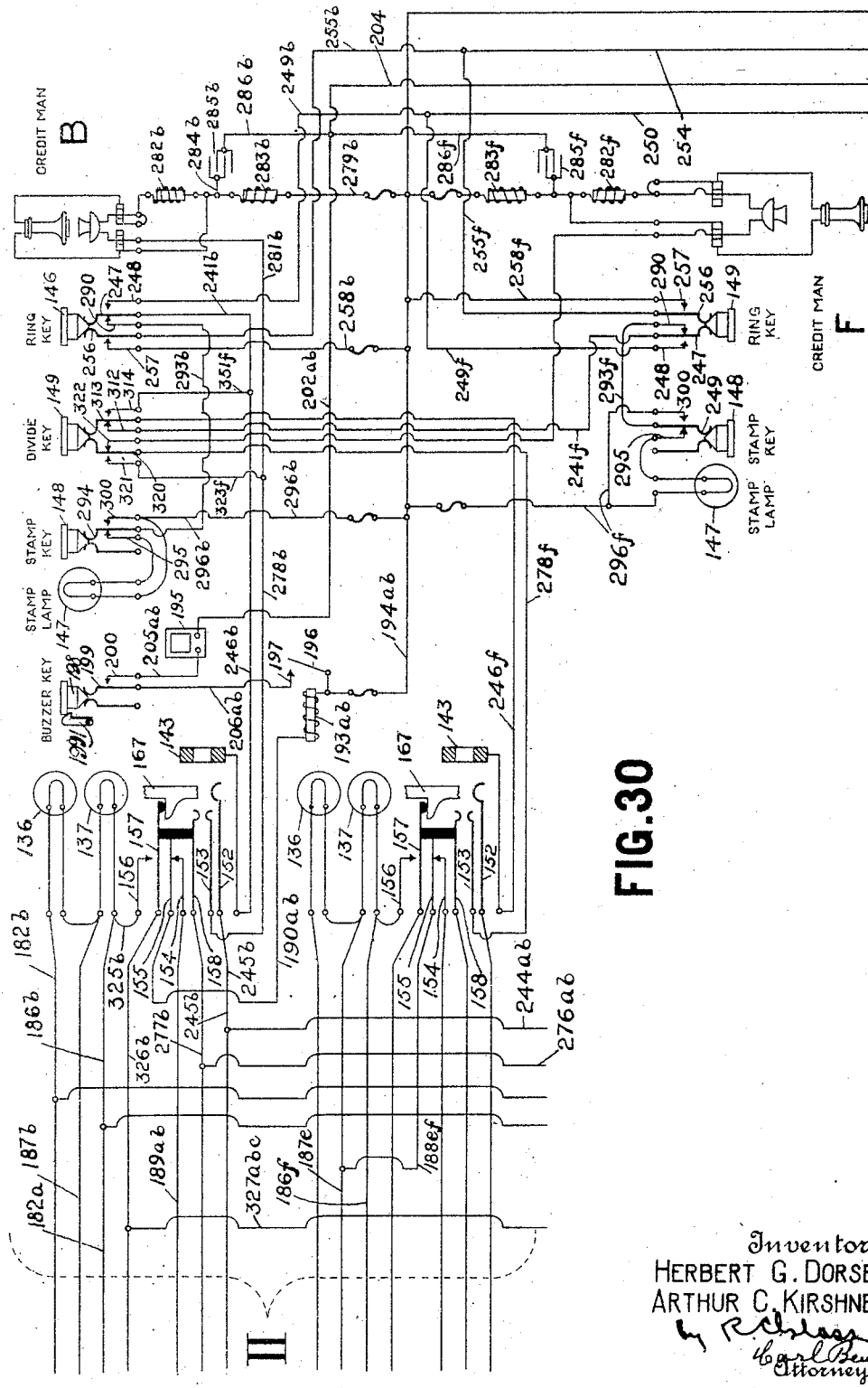

UNITED STATES PATENT OFFICE.

HERBERT G. DORSEY AND ARTHUR C. KIRSHNER, OF DAYTON, OHIO, ASSIGNORS TO THE NATIONAL CASH REGISTER COMPANY, OF DAYTON, OHIO, A CORPORATION OF OHIO, (INCORPORATED IN 1906.)

CREDIT-SLIP-AUTHORIZING APPARATUS.

1,321,900. Specification of Letters Patent. Patented Nov. 18, 1919.

Application filed March 2, 1916. Serial No. 81,666.

*To all whom it may concern:*

Be it known that we, HERBERT G. DORSEY and ARTHUR C. KIRSHNER, citizens of the United States, residing at Dayton, in the county of Montgomery and State of Ohio, have invented certain new and useful Improvements in Credit-Slip-Authorizing Apparatus, of which we declare the following to be a full, clear, and exact description.

This invention relates to store service systems and has for its main object to provide mechanism for assisting in the authorization of credit sales.

In many commercial houses the problem of compelling sales people to secure proper authorization before making a sale on credit is a very important one. It is obviously unsafe in most cases to trust the judgment of the clerks as to whether credit should be allowed and to compel a message being sent to some credit man who is authorized to allow credit is a lengthy and tedious proceeding. In many cases an improvement has been made by using a telephone over which the credit man is communicated with, but even in such cases there is nothing to show that the credit man authorized any particular transaction. The invention is designed, therefore, to obviate this difficulty by providing means for making a permanent record on sales slips to authorize credit in particular cases and so arranging the means that it can be operated only by the credit man and not by the clerk. To be more specific, the telephone is used as a means of communication between the clerk and the credit man so that both the identity of the customer and the amount of the purchase may be made known to the latter, and an electrically operated stamp located at the clerk's station is provided to stamp an inserted sales slip, the stamp being operated by the credit man through electrical connections to the credit man's station.

Another object of this invention is to provide means at the clerks' stations for selecting any desired one of a plurality of credit men, each credit man being provided with individual means for ringing the clerks, communicating with the clerks and operating the stamps.

Another object of this invention is to provide means whereby one credit man may take care of the switchboards of a plurality of credit men and handle the calls received on the switchboards by his own telephone set, ring key, and stamp controlling means. In such case the credit man on duty completes the line connections to the various clerks' telephones and stamping devices at the switchboards receiving the particular calls but handles the calls by using his own ring key, telephone set and stamp controlling means.

Another object of this invention is to provide means whereby the calls ordinarily handled at the switchboard of a credit man are transferred to the switchboard of another credit man. When the calls are transferred from one switchboard to another the credit man at the latter makes all the line connections at his own switchboard as well as handles all the calls by his own telephone set, stamp controlling means and ring key.

A still further object of the invention is to arrange the stamps and a signal for indicating the absence or presence of the slip to be stamped in series for operating the signal and provide means for excluding the signal from the circuit to operate the stamp.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Of said drawings:—

Fig. 3 is a transverse vertical section taken on the line 3—3 of Fig. 5 and looking in the direction of the arrows. The base of the device and the bell have been omitted.

Fig. 4 is a transverse vertical section taken on the line 4—4 of Fig. 5 and looking in the direction of arrow.

Fig. 12 is a top plan view of the dating device and inking means therefor, the top plate of the frame supporting the same being removed.

Fig. 13 is a left hand detail view of the supporting frame for the dating device, part of the ribbon feeding means being removed.

Fig. 14 is a detail sectional view taken on the line 14—14 of Fig. 12 and looking in the direction of the arrows.

Fig. 15 is a detail sectional view taken on the line 15—15 of Fig. 12 and looking in the direction of the arrows.

Fig. 16 is a right hand side elevation of the frame supporting the dating device.

Fig. 17 is an enlarged detail sectional view taken on the line 17—17 of Fig. 12 and looking in the direction of the arrows.

Fig. 18 is a detail view of the turn button or disk for adjusting the year date wheel.

Fig. 19 is a perspective view of one of the desks supporting two of the switchboards at the credit station.

Fig. 20 is a detail top plan view of the section of a credit man's switchboard, carrying the white line lamps and the line jacks.

Fig. 21 is a detail sectional view taken on line 21—21 of Fig. 23 and looking in the direction of the arrows.

Figs. 22 and 23 are detail front views of the section of the credit man's switchboard shown in Fig. 18 partly broken away. In Fig. 23 the transfer key is shown in normal position and in Fig. 22 in operated or transfer position.

Fig. 24 is a detail rear view, partly broken away, of the section of the switchboard, shown in Figs. 22 and 23.

Figure 1:
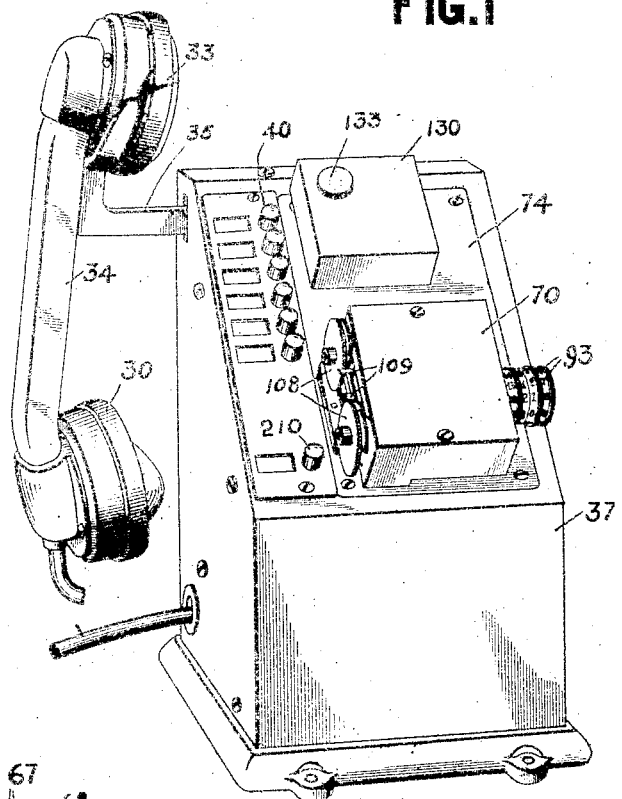
Figure 1 is a reduced perspective view of the clerk's telephone and stamping device.

Figs. 25, 26, 27 and 28 are enlarged detail views of one of the line jacks on a credit man's switchboard. Figs. 25 and 26 show the condition of the jack when the plug is not inserted and the transfer key is in normal and operated positions respectively. Figs. 27 and 28 show the condition of the jack when the plug is inserted and the transfer key is in normal and operated positions respectively.

Fig. 29 is a diagrammatic view of the electric circuits of the system.

Fig. 30 is a diagrammatic view of the electrical connections at two of the switchboards.

In this system a telephone and stamping device are provided at each clerk's station. When credit is to be asked for a customer the clerk presses a key to call the credit man handling the credit account of the customer. Depression of the key notifies the credit man that his attention is desired by a lamp signal, as shown in the particular embodiment. The credit man connects his telephone set with that of the clerk's and then rings the clerk to indicate that he is ready to be communicated with. The clerk then removes her telephone from the hook and reads the amount of the sale and name of the customer desiring credit and if such credit is to be given the credit man operates a switch controlling the stamping device at the clerk's station to make an impression on the sales slip, thereby authorizing the credit. If, however, credit is not to be given the credit man can communicate over the telephone with the clerk and give whatever instructions are necessary such as a request that the customer call at the office.

In order that the detailed description which is to follow may be understood better a general outline of the arrangement and operation of the system as illustrated diagrammatically in Fig. 29 will be given. It will be obvious that the arrangement shown in Fig. 29 is for illustrative purposes only, the system being capable of meeting all demands and requirements of any mercantile establishment carrying on a credit business. Eight credit men are employed at the central or credit station and each credit man is provided with a switchboard. Two switchboards are supported on a single desk. Four credit men, one at each desk, normally take care of the calls from a number of clerks' stations and the other four credit men take care of the calls from the remaining clerks' stations, the store in this manner being divided into two divisions. Each credit man is assigned certain letters of the alphabet in the credit file so that he handles calls from all of the clerks' stations in his division of the store, but only for his division of the alphabet. Each stamping device is provided with a plurality of keys, one for each credit man in the division of the store in which the stamping device is located.

Each switchboard comprises two rows of differently colored line lamps, preferably red and white, a row of line jacks, the telephone set, a stamp key for controlling the stamping devices, and a ring key for ringing the clerks. The switchboards of the credit men taking care of one of the divisions of the store are arranged in pairs, that is, the switchboards are so electrically connected that all of the calls ordinarily handled at one of the switchboards of the pair can normally be handled at the other switchboard and vice versa. When a clerk depresses one of the keys on the stamping device a white line lamp on the switchboard of the desired credit man is lighted as well as the corresponding red line lamp on the other switchboard of the pair. These lamps, when lighted, indicate the particular clerks' stations calling. Ordinarily a credit man answers only the calls shown by the white lamps; however, if not busy he may also answer calls shown by the red lamps and in this way assist the credit man at the other switchboard of the pair when the latter credit man may have an unusual rush of business to handle.

When a credit man is off duty or temporarily absent from his switchboard the credit man at the other switchboard of the pair may take care of all the calls received at the two switchboards by answering all the calls shown by both the red and white line lamps, or the credit man when he leaves may close a switch by a key, called the "connecting" key herein, so that the credit man at the same desk may handle all of the calls received on both switchboards of the desk. In the latter case the credit man remaining on duty answers the calls for the clerks' stations in both divisions of the store but only for his section or division of the alphabet. This he does by inserting plugs in the line jacks on both switchboards and using the telephone set and stamping and ringing keys at one switchboard only. By answering the calls indicated by both the white and red lamps on the switchboard of a desk the credit man may handle during slack business hours, all of the calls ordinarily handled at four switchboards if the connecting key is operated at the desk at which he is handling the calls. In this way two credit men are able to handle all of the calls on the eight switchboards when the other credit men are absent.

Two credit men, as above stated, may handle at two desks all of the calls ordinarily handled by the eight credit men but it is clear that when only one credit man is on duty it would be difficult and tedious for him to handle all the calls on the switchboards of two desks which would be the case if the connecting keys on the two desks were operated and the credit man answered the calls indicated by both the red and white lamps on the four switchboards on the desks.

Means are provided therefore for transferring or switching the calls from a switchboard on one desk to a switchboard on another desk so that all of the calls can be handled by a credit man at one desk. In this way the calls received and answered on the switchboards of two desks can be transferred to the switchboards on another desk and then if the connecting key on the latter desk is depressed the credit man at this latter desk can answer all of the calls indicated by the red and white lamps.

*Clerk's telephone and stamping device.*

Figure 5:
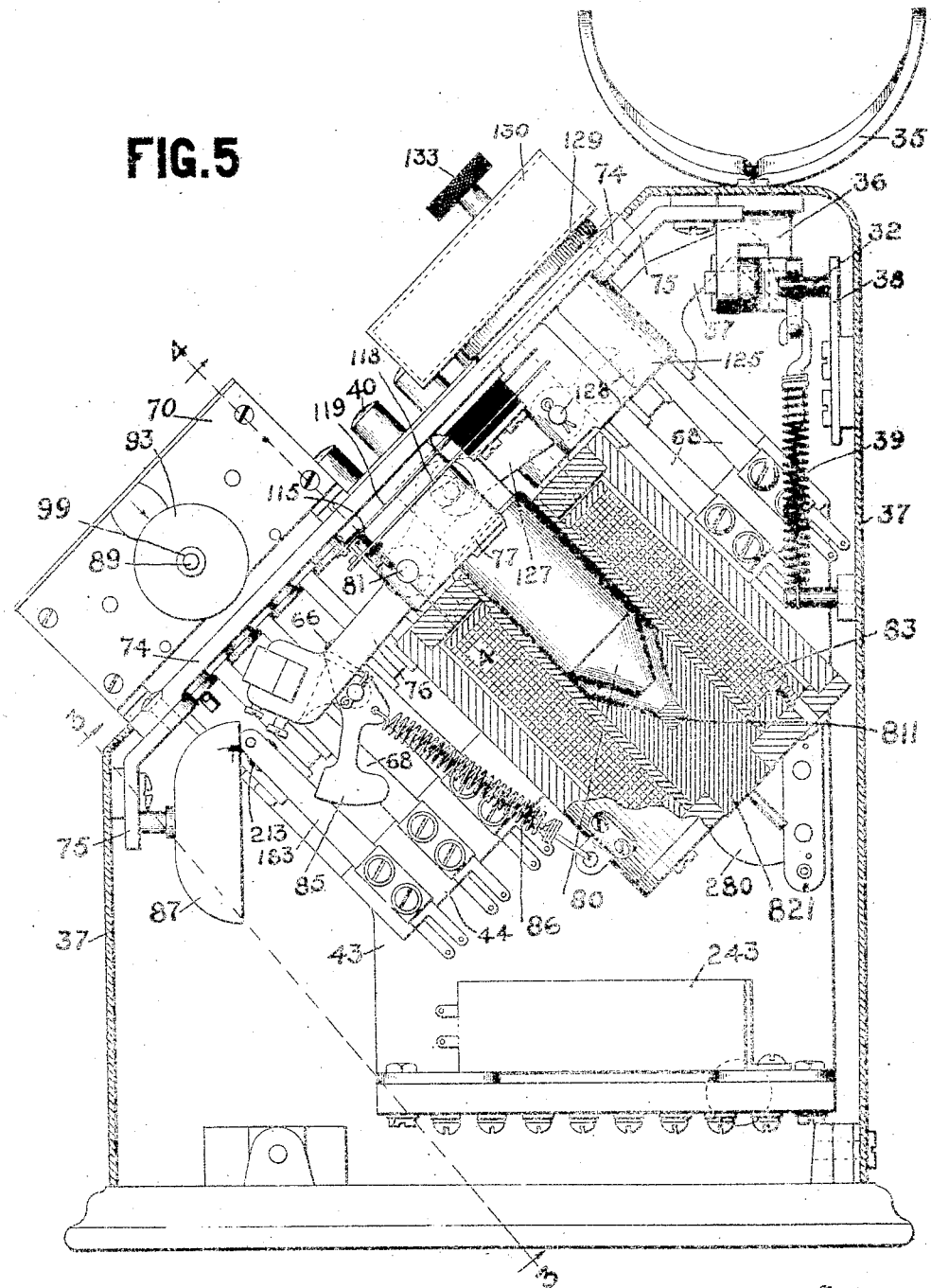
Fig. 5 is a right hand side elevation of the stamping device with the cabinet and the solenoid of the stamp shown in cross section.
Figures 10, 11:
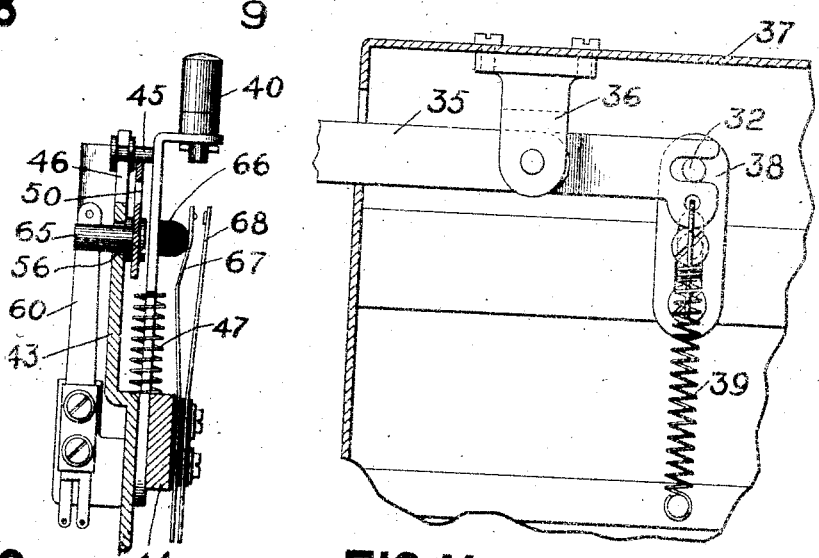
Fig. 10 is a detail sectional view taken on the line 10—10 of Fig. 7 and looking in the direction of the arrows.
Fig. 11 is a detail view of a clerk's telephone hook partly broken away, and the supporting means therefor.

The clerk's telephone comprises a transmitter 30 (Fig. 1) and a receiver 33 both of which are mounted on a hand grip 34. The clerk's telephone is hung on a hook 35 which is pivoted on a bracket 36 (Figs. 5 and 11) fast on the cabinet 37 of the stamping device. The right hand end of the receiver hook 35 is provided with a recess through which projects a pin 32 on a bar 38 slidably mounted on the cabinet 37. When the telephone is removed from the hook 35 a spring 39 interposed between the hook and a pin on the cabinet, rocks the hook clockwise, thereby lowering the bar 38 which is employed to limit movement of the hook.

Figure 6:
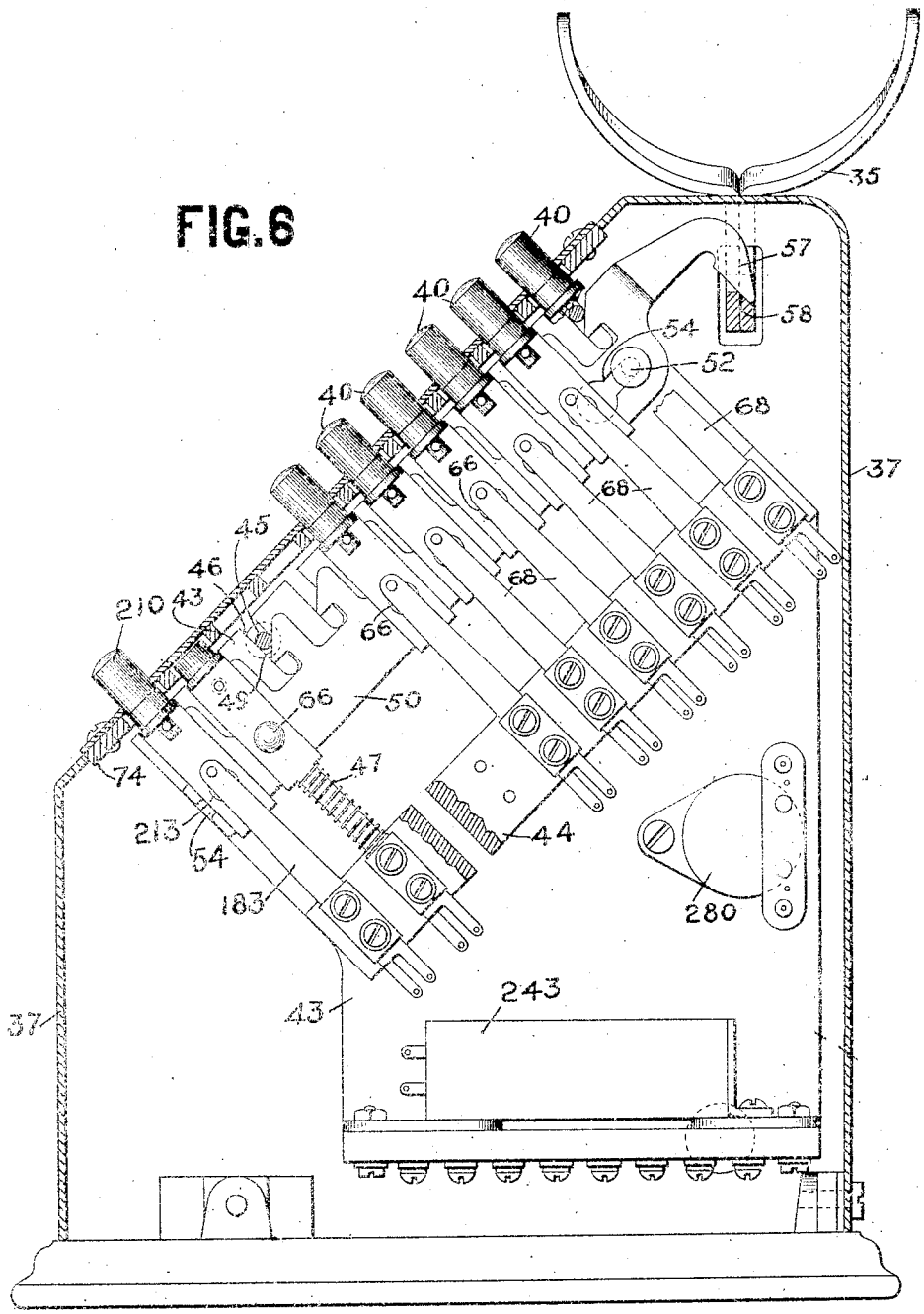
Fig. 6 is a transverse vertical section taken along the right hand side of the bank of keys of the stamping device and looking toward the left.
Figure 7:
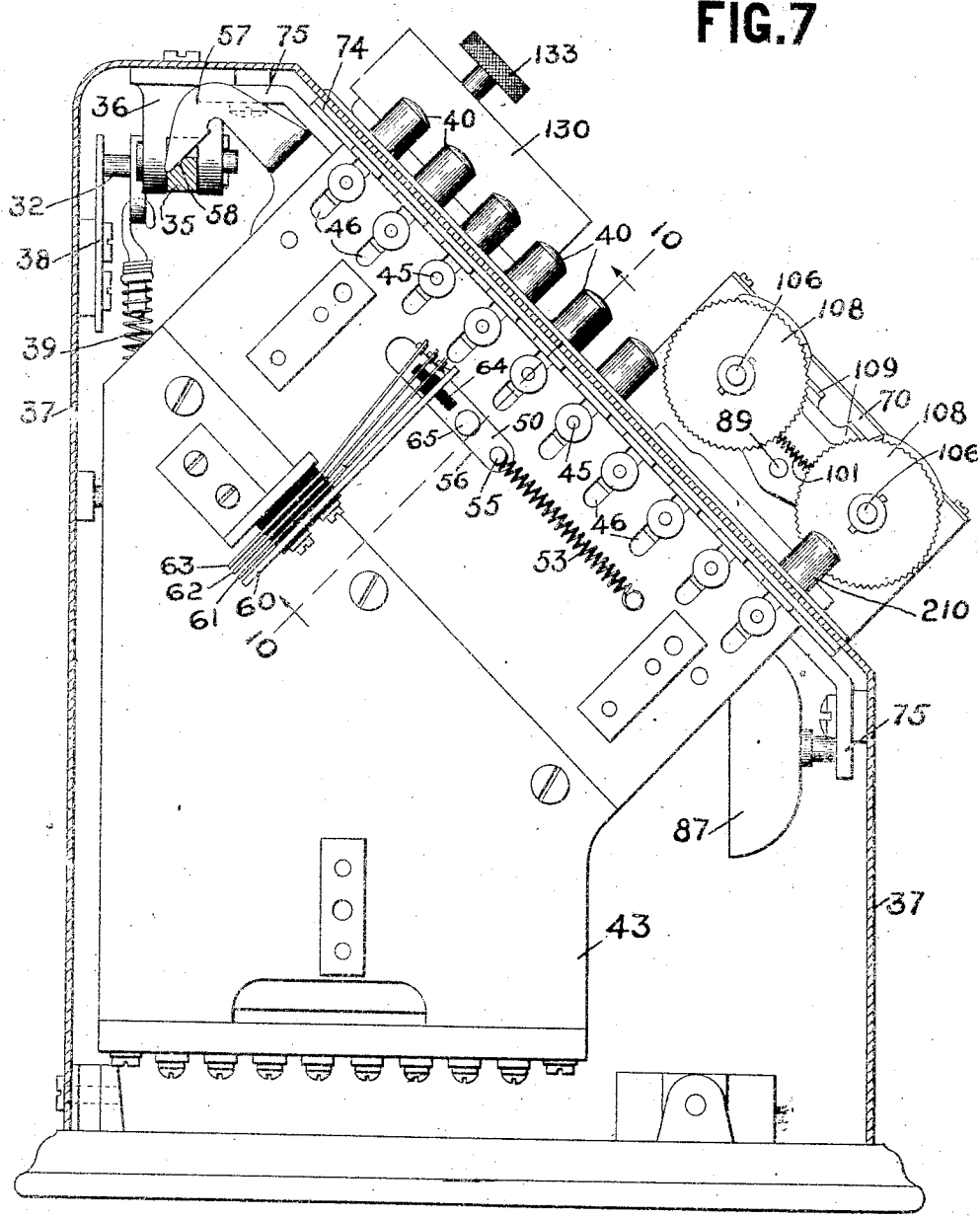
Fig. 7 is a left hand side elevation of the stamping device with the cabinet shown in cross section.

Keys 40 (Figs. 1, 6, 7 and 10) assigned to the various credit men at the credit station, are slidably mounted on a frame 43 fast on the cabinet of the machine. Six keys 40 are shown in the figures, but the number may be varied, according to the number of credit men employed. The lower ends of the keys 40 are slidably mounted in a bar 44 fast on the frame 43 and the keys carry pins 45 projecting through slots 46 (Fig. 7) in the frame 43. Springs 47, (Figs. 6 and 10) coiled about the key shanks and compressed between the bar 44 and shoulders on the keys, serve to retain the keys in normal undepressed position and to restore the keys to this position when they are released. When a key is depressed its pin 45 engages the inclined edge of a corresponding shoulder 49 (Fig. 6) on a detent 50 thereby raising the detent until the pin 45 has passed out of engagement with and beneath the inclined edge of the shoulder 49 when a spring 53 (Fig. 7) restores the detent to normal position thereby moving the shoulder 49 over the pin 45 on the depressed key to lock the latter in depressed position. The detent 50 is provided with slots 54 through which pins 52 (Figs. 3 and 6) on the frame 43 project, the detent being mounted slidably in this manner. The spring 53 (Fig. 7) is interposed between a pin 55, which projects from the detent 50 through a slot 56 in the frame 43, and a pin on the frame 43.

The upper end of the detent 50 is provided with a projection 57 (Figs. 6 and 7) which engages a beveled edge 58 on the receiver hook 35 so that when the receiver hook is raised upon removal of the clerk's telephone the detent 50 is raised to release the depressed key. It is understood, of course, that the spring 39 (Fig. 11) is stronger than the spring 53 (Fig. 7) so that when the receiver hook is raised by the spring 39 the detent is raised against the action of the spring 53.

A rigid contact 60 (Fig. 7) and three spring contacts 61, 62 and 63 are mounted on the frame 43 and the contacts 60 and 61 are normally in engagement. A pin 64 of insulating material is slidably mounted on the contacts 60, 61 and 62. When the detent 50 is raised by the raising of the telephone hook 35 a pin 65 on the detent engages the pin 64 whereupon a shoulder on the pin 64 moves the contact 61 out of engagement with the contact 60 and moves the three contacts 61, 62 and 63 into engagement with each other. Each key 40 carries a pin 66 of insulating material (Fig. 10) which, when the key is depressed moves a contact 67 into engagement with a contact 68, a pair of these contacts 67 and 68 being provided for each key.

Figure 8:
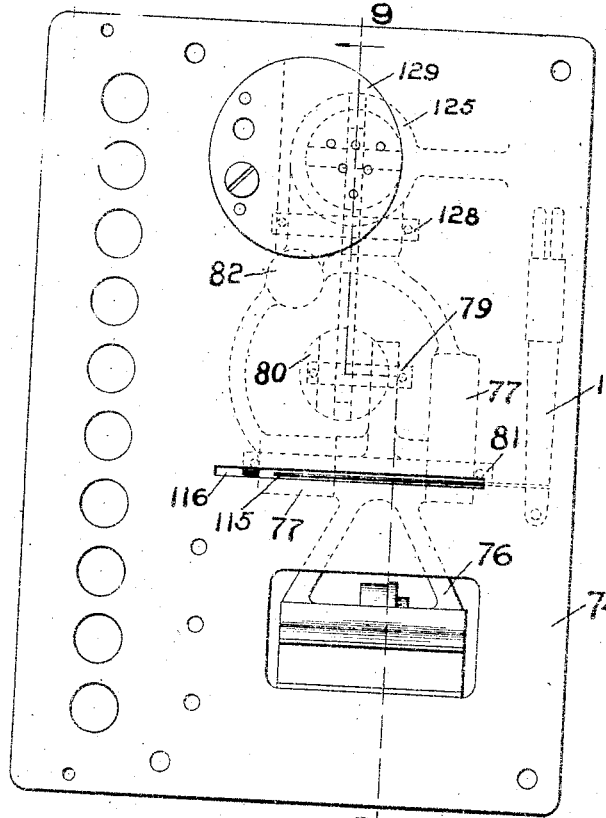
Fig. 8 is a detail view of the punching mechanism and platen and the plate or frame supporting the same.
Figure 9:
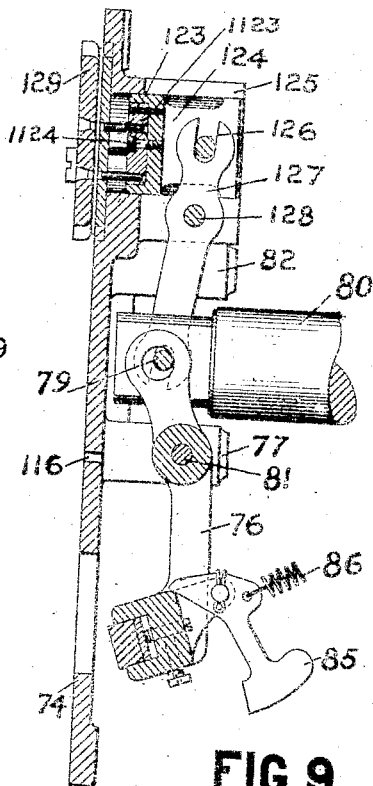
Fig. 9 is a detail transverse vertical section taken on the line 9—9 of Fig. 8 and looking in the direction of the arrows.

The sales slip to be stamped is inserted under a frame 70 (Figs. 1, 3, 5, 12 and 16) in which are supported date wheels 73 (Fig. 12). The frame 70 is mounted on a plate 74 supported by brackets 75 (Fig. 5) fast on the cabinet 37. A platen lever 76 (Figs. 5, 8 and 9) is operated under the control of the credit man to carry the sales slip against the date type carriers 73, the printing impression taken from the type carriers showing that the credit was authorized. The platen lever 76 is loose on a cross rod 81 mounted on depending portions 77 of the plate 74 and its rear end is provided with an opening through which a pin 79 mounted in the upper end of a core of a solenoid 83 projects. The solenoid 83 is mounted on the depending portions 77 and 82 of the plate 74. When credit is to be extended the credit man energizes the solenoid 83 whereupon the core 80 is drawn down to operate the platen lever 76 to make a printing impression on the sales slip from the date type carriers 73.

The downward movement of the core 80 is limited by engagement of its lower end with a block 811 of poor conducting material seated in a stationary core member 821. The block 811 prevents the conical surface of the lower end of the core 80 from contacting with sides of a corresponding shaped hole in the upper end of the member 821 which might result in residual magnetism retaining the core 80 in operated position after the solenoid is deënergized.

When the platen lever 76 is operated the impact of the platen against the type carriers 73 causes a hammer 85 (Fig. 5) pivotally mounted on the platen lever 76 to rock relative to the latter against the action of a spring 86 and strike a bell 87, thereby notifying the clerk that the sales slip has been stamped.

The date type wheels 73 (Fig. 17) are rigidly mounted on the left hand ends of nested sleeves 88 mounted on a rod 89 which is supported in the frame 70 and a bracket 90 fast on the frame 70. Adjusting disks 93 (Figs. 12, 16, 17 and 18) having knurled ridges or flanges, are mounted on the right hand ends of the sleeves 88. The disks 93 have fingers or tongues which project into slots formed in the sleeves 88 so that the disks may be slid on the sleeves and turn the latter. The left hand face of each of the disks 93 is provided with holes 94 in which a pin 95 projecting from the right hand face of the adjacent disk 93 is adapted to engage. The holes 94 in the left hand disk 93 are adapted to be engaged by the pin 95 projecting from the frame 70. A spring 97 is coiled about the rod 89 and is compressed between the bracket 90 and a collar 98 fast on the rod 89. Mounted on the right hand end of the rod 89 is a disk 99 engaging in the corresponding depressed portion formed in the right hand face of the right hand disk 93.

To illustrate the manner in which the date wheels are operated, assume that the months date wheel and the tens of days date wheel are to be adjusted. The corresponding disks 93, that is, the two right hand disks are slid toward the right on the corresponding sleeves 88 together with the rod 89, against the action of the spring 97. This movement of the two disks 93 disengages a hole 94 in the tens of days disk from the pin 95 on the units of days disks and then the two disks which have been pulled out are rotated together to adjust the tens of days wheel to the proper position. The tens of days disk 93 is then slid back to normal position on its sleeve 88 thereby moving the hole 94 opposite the pin 95 in the units of days disk over the pin and disengaging the pin 95 in the tens of days disk from a hole in the months disk. Then the months disk is adjusted to the proper position and released, whereupon the spring 97 moves the rod 89 and the months disk so that one of the holes 94 in the latter engages over the pin 95 in the tens of days disk. From the above description it can be seen that the adjusting disks 93 are normally locked against adjustment by the pins 95 and that it is necessary to adjust the disks 93 in succession from left to right. The engagement of the holes 94 over the pins 95 insures exact alinement of the date wheels.

An inking ribbon 100 (Figs. 12, 14 and 15) passes from one roll 103 about guide rollers 104 to a roll 105. The rolls 103 and 105 are mounted on shafts 106 supported in the sides of the frame 70 and the rolls are retained in proper positions on the shafts by springs 107 coiled about the shafts. Milled disks 108 (Figs. 7 and 12) are fast on the shafts 106 and serve to rotate the rolls 103 and 105 forward or backward as desired. Pivotally mounted on the frame 70 at the sides of the milled disks 108 are retaining pawls 109 (Figs. 7, 12 and 13) having projections normally retained in engagement with the peripheries of the milled disks by a spring 101. If the clerk presses his finger on one of the milled disks in order to rotate it he will thereby move one of the pawls out of engagement with the other disk and as the disk which he rotates is engaged by the other pawl it is possible to rotate it only in the direction that the ribbon is wound on the respective roll.

An arm 115 (Figs. 3, 4 and 8) is pivotally mounted on the plate 74 and its left hand end projects through a slot 116 in the plate 74 and into a groove 117 (Figs. 4 and 14) formed in the rear wall of the frame 70. When the sales slip to be stamped is placed under the date type carriers 73 it engages the arm 115 and rocks it counter clockwise (Fig. 4) thereby moving a spring contact 118 (Figs. 4 and 5) into engagement with a contact 119 to close a circuit through a lamp at the credit man's station for the purpose of lighting the lamp to indicate that the sales slip is in position to be stamped. As the spring contact 118 retains the arm 115 in engagement with the sales slip it can be seen that this arm also serves to hold the slip in position to be stamped.

It is usual when the goods purchased are left by the customer for delivery by the store to send a delivery slip with the goods to the delivery department, the delivery slip having the address and any other desired information. In order to notify the delivery department the sale has been authorized, punching means is provided for perforating the delivery slip. The delivery slip may be attached to the usual sales slip or it may be a separate slip in which case it is placed under the sales slip when inserted.

Punches 123 (Fig. 9) are mounted in a plate 1123 detachably mounted by a screw 1124 to a punch head 124 slidably mounted in a bushing 125 formed on the plate 174. The punch head 124 carries a pin projecting through a recess 126 formed in a lever 127 pivoted at 128 on the bushing 125. The pin 79 carried by the core 80 projects through a recess formed in the forward end of the lever 127. It can be seen from this construction that when the solenoid 83 is energized to move the sales slip against the date type carriers 73 the punch head 124 is raised through the lever 127 to force the punches 123 through the delivery slip into holes formed in a die 129 (Figs. 8 and 9) thereby perforating the delivery slip. A box 130 (Figs. 1 and 5) is screwed on the die 129 by a thumb screw 133 and catches the punched pieces.

*Switchboards at credit station.*

One of the desks carrying two of the switchboards operated by credit men is shown in Fig. 19. It is understood, of course, that the number of desks and switchboards employed in any establishment depends upon the volume of credit business transacted. The circuits as shown in Fig. 29 provide for four such desks.

Each switchboard comprises two rows of line lamps the lamps 136 in the upper row being preferably red while the lamps 137 in the lower row are preferably white. Below each white lamp is its corresponding line jack 138 (Figs. 22 and 23) through which line connections are made by the insertion of the credit man's plug 139 into sockets 140 formed in a frame 143 carrying the row of line jacks and the row of white line lamps 137. When a credit man is on duty he inserts his telephone plug of ordinary form into a socket 144 (Fig. 19) so that when he inserts his line plug 139 into the line jack below a lighted lamp he will establish line connections between the clerk's station calling and his own switchboard.

It is understood, of course, that there is one line jack for each clerk's telephone and stamping device in the corresponding division of the store. For example, if but two switchboards are employed, lines from certain clerks' stations terminate in one switchboard and the lines from the other clerks' stations terminate in the other switchboard so that each of the two credit men handles calls only from certain clerks' stations. Of course, if it is desired, the electrical connections may be arranged so that each credit man handles calls from all of the clerks' stations in the store but only for one division of the alphabet.

If more than two switchboards are provided each credit man is assigned certain letters of the alphabet and takes care of all the calls from all the clerks' stations in one division of the store, but only for his particular division of the alphabet. In such case the switchboards of the credit men taking care of one division of the store are arranged in pairs or multiple so that when a white line light 137 on one switchboard is lighted the corresponding red line lamp 136 on the other switchboard of the pair is lighted, and vice versa. A credit man can then answer the calls indicated by either the red or the white line lamps by inserting his plug 139 into the corresponding line jack.

When a credit man desires to notify a clerk that he is ready to be communicated with he presses his ring key 146 thereby causing the diaphragm of the clerk's telephone receiver to vibrate or hum. The clerk then lifts her telephone from its hook and communicates with the credit man. When the clerk inserts the sales slip into position to be stamped the contacts 118 and 119 (Fig. 5) are moved into engagement to close a circuit through a lamp 147 thereby notifying the credit man that the slip is in position to be stamped. The credit man then depresses the stamp key 148 if credit is to be given to close a circuit through the stamp solenoid 83 and thereby operate the stamp as above described.

When a credit man leaves his switchboard he depresses the connecting key 149 (Fig. 19) between the two switchboards on the desk so that the other credit man at the desk can plug in the line jacks on either switchboard and communicate with the clerks in both divisions of the store by one of the telephone sets, ring the clerks by the corresponding ring key 146 and operate the stamps by the corresponding stamp key 148.

When a credit man leaves his switchboard he may depress the connecting key as above stated or pull out a transfer key 150 on his switchboard to transfer the calls from his switchboard to another switchboard. In such case the white line lamps on the credit man's switchboard to which the calls are transferred are lighted whenever the clerks attempt to call the credit man at the switchboard from which the calls are transferred. The credit man at the switchboard to which the calls are transferred can then handle the calls at his own switchboard. The effect of pressing the connecting key 149 or pulling out the transfer key 150 will be understood better from a description of the circuits which is to follow presently.

The line jacks 138 and the transfer key 150 will now be described in detail so that a description of the electrical circuits will be understood more readily. Each line jack 138 (Figs. 22, 23, 25, 26, 27 and 28) comprises seven spring contacts 152 to 158 inclusive mounted in the frame 143. Normally the line jacks are in the condition shown in Fig. 25, the contacts 154 and 155 being the only contacts in engagement. When the plug 139 (Figs. 22 and 27) is inserted into a jack the sleeve 160 of the plug contacts with the spring 152 and the point 163 of the plug engages the contacts 153 and 158. The contact 158 normally engages a pin 164 of insulating material on the contact 155 thereby normally retaining the contacts 154 and 155 in engagement. When the plug 139 is inserted movement of the contact 158 permits the contact 155 to move out of engagement with the contact 154.

The transfer key 150 (Figs. 22 and 23) is slidably mounted in the frame 143 carrying the line jacks. The transfer key has a conical portion 165 engaging a nose 166 on a plate 167 slidably mounted on the frame 143 the frame being provided with screws 169 which project through slots in the plate. The plate 167 is provided with downwardly extending projections 170 engaging blocks 173 of insulating material on the corresponding contacts 157 which tend to move the plate 167 toward the right. When the transfer key 150 is drawn out from its normal (Fig. 23) to its transfer position (Fig. 22) its conical portion 165 moves the plate 167 toward the left against the action of the contacts 157 to the position shown in Figs. 22 and 26. A pin 172 of insulating material is mounted in the contacts 153 to 157 inclusive and is so constructed that when the contact 157 is moved by movement of the transfer plate 167 to transfer position the contact 154 is moved out of contact with the contact 155 and the contact 157 is moved into engagement with the contact 156.

After the transfer key is drawn out to transfer position the corresponding switchboard is not to be used. Fig. 28 however, shows the plug 139 inserted into a line jack after the transfer key has been pulled out to transfer position in order to show that the condition of the line jack is not changed in case the credit man forgets to pull out the plug 139.

In order to aline the transfer key in its normal and transfer positions the lower V-shaped portion of a spring 175 (Figs. 22 and 23) on the frame 143 engages in one of the annular grooves 176 formed in the transfer key when the transfer key is in one of its two positions.

Electric circuits.

Figure 2:
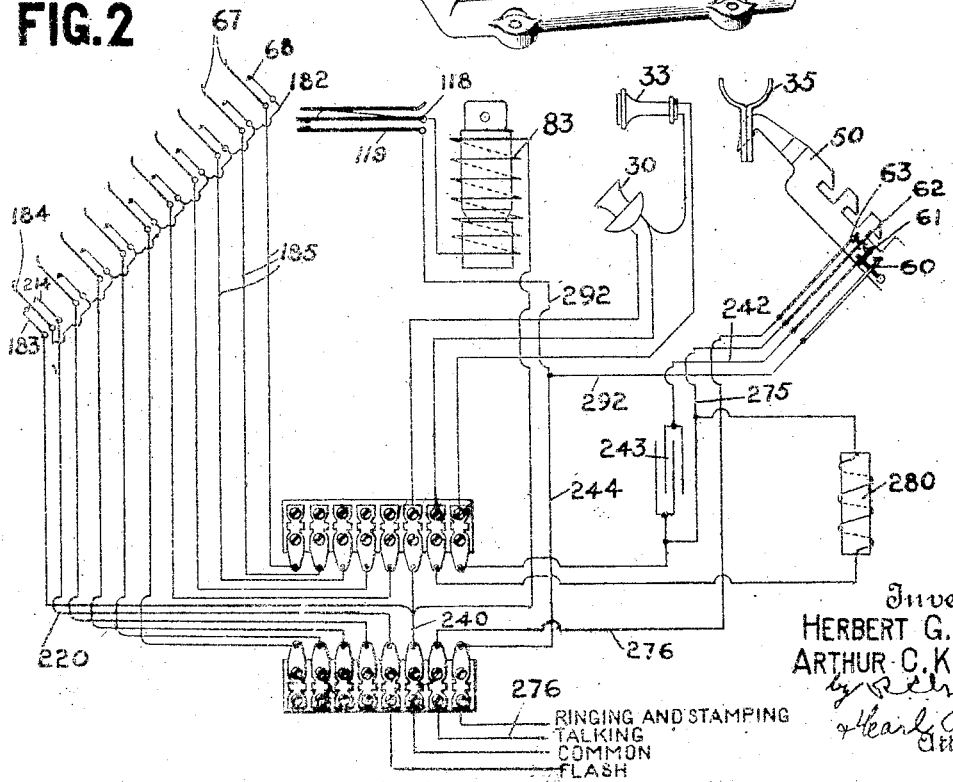
Fig. 2 is a diagrammatic view of the electrical connections of the clerk's telephone and stamping device.

Having described in detail the mechanical construction of the clerks' telephones and stamping devices and of the credit men's switchboards the electrical circuits will now be described with particular reference to the diagrammatic views shown in Figs. 29 and 30. Reference may be had to Fig. 2 for a relative arrangement of the electrical connections at the stamping device and clerk's telephone if desired.

In Fig. 29 eight switchboards at the central station are represented, each switchboard being represented by one line jack 138 and the corresponding red and white lamps 136 and 137. For convenience the different switchboards have been lettered and the desks carrying the switchboards have been numbered. The telephone sets and the various keys are shown on the switchboards on desk II only. Furthermore, only two of the clerks' telephones and stamping devices are shown in this figure. The credit men at the switchboards A, B, C and D normally handle all the calls from one-half of the clerks' stations, including clerk's station X, and the other credit men at switchboards E, F, G and H handle all the calls from the other half of the clerks' stations including the clerk's station Y. The switchboards A and B, E and F, C and D and G and H are arranged in pairs so that when a white line lamp 137 at one switchboard is lighted the corresponding red line lamp 136 at the other switchboard of the pair is lighted and vice versa.

For the sake of convenience the various corresponding connections (with the exception of the contacts) to the different switchboards are designated by the same reference numerals with the reference letters $a$, $b$, $c$, $d$, $e$, $f$ and $g$ added, the reference letters being indicative of the switchboards to which the connections are appropriate. The like reference numerals for the corresponding electrical connections at the clerks' stations have the reference letters $x$ and $y$ added so that the connections of the two stations are also readily distinguishable.

For the sake of illustration the various electrical connections and circuits between clerk's station X and switchboard B when the connecting key and transfer key at the latter switchboard are not operated will be described, it being understood that the connections between any clerk's station and a credit man's switchboard are similar under these conditions.

Line signal circuit.

When a clerk at station X desires to communicate with the credit man at switchboard B she presses the $b$ key 40 thereby moving the contacts 67 and 68 into engagement, as above described, to close a circuit which is as follows: from the generator through the main positive wire, wire 180$x$, contacts 183 and 184, wire 182$x$ common to the contacts 68, contacts 68 and 67 closed by the $b$ key, wire 185$b$, wire 186$b$, white lamp 137, wire 187$b$, wire 188$ab$, contacts 155 and 154 of line jack $x$ at switchboard A, wire 189$ab$, contacts 154 and 155 of the line jack $x$ at switchboard B, wire 190$ab$ common to the contacts 155 at switchboard B, relay 193$ab$, wire 194$ab$, thence through the main negative wire to the generator. The current over this circuit lights the white line lamp 137 appropriate to clerk's station $x$ on the switchboard B to notify the credit man that communication is desired. It will be obvious that the red line lamp 136 on switchboard A is arranged in multiple with the corresponding white line lamp 137 on switchboard B as part of the current passes from wire 185$b$ through wire 182$a$, red lamp 136 at switchboard A, and wire 187$a$ to the wire 188$ab$. Therefore each time a white line lamp on switchboard B is lighted the corresponding red line lamp on switchboard A is lighted and vice versa.

Buzzer circuit.

If desired, a buzzer 195 may be employed at each desk for use in case a credit man desires to leave his switch-board temporarily or is engaged in correcting or marking the cards of the cedit index. The buzzer circuit includes the armature 196 of the relay 193$ab$ which is energized by the current over the line signal circuit to move the armature 196 into engagement with a contact 197. When a buzzer key 198 (Figs. 19, 29 and 30) is depressed and retained in depressed position by a latch 1991 (Fig. 30), a contact 199 is moved into engagement with the contact 200 so that when the armature 196 is moved into engagement with the contact 197 a circuit is completed through the buzzer thus audibly calling the credit man's attention to the desire for communication. This circuit is as follows: from the generator through the main positive wire, wires 203, 204 and 202$ab$, buzzer 195, wire 205$ab$, contacts 200 and 199, wire 206$ab$, contact 197, armature 196 of the relay 193$ab$, wire 194$ab$ and thence through the main negative wire to the generator.

Flash circuits.

When the goods purchased are to be taken by the customer it is necessary that the credit be authorized before the customer leaves with the goods, but in cases in which the goods are to be delivered it is not necessary in some cases that the customer wait until the credit has been authorized. It is therefore desirable that a credit man authorizes sales in which the goods are to be taken with the customer before he authorizes sales involving delivery. Therefore in order to notify the credit man when the customers wish to take the goods with them each of the clerks' stamping devices is provided with a key 210 (Figs. 1 and 3) which, when depressed simultaneously with one of the keys 40, controls electrical connections which cause the corresponding white line lamp on the selected switchboard to flash.

The key 210 is constructed similarly to the keys 40 and is slidably mounted on the key frame 43 in the same manner, and when depressed is locked in depressed position by the detent 50. The key 210 carries a pin 213 (Fig. 3) which, when depressed moves a contact 214 into engagement with the contact 184 and through a pin 215, slidably mounted on the contacts 183 and 184, moves the contact 183 out of engagement with the contact 184 so that the above described signal circuit is not closed. When, however, one of the keys 40, for example, the b key is depressed with the key 210, another circuit is closed. This circuit is as follows: from the generator through the main positive wire, wire 216, relay 217, wire 218, wire 219, wire 220x, contacts 214 and 184, wire 182x, contacts 68 and 67, wire 185b, wire 186b, white line lamp 137 on switchboard B, wires 187b and 188ab, contacts 155 and 154 of line jack x at switchboard A, wire 189ab, contacts 154 and 155 of line jack x at switchboard B, wire 190ab, wire 194ab, thence through the main negative wire to the generator. The resistance of the relay 217 in this circuit is sufficient to lower the amount of current passing through the line lamp so that the latter is not lighted. The relay 217, however, is energized so that it attracts its armature 223 thereby moving the armature into engagement with the contact 224 to close a circuit which is as follows: from the generator through the main positive wire, wire 216, wire 225, relay 226, contact 224, armature 223, wire 227, thence through the main negative wire to the generator. The current passing through the relay 226 energizes the latter whereupon it attracts its armature 228 to move the latter into engagement with a contact 229. It is obvious that a large part of the current now passes from the generator through the main positive wire, wire 216, wire 225, contact 229, armature 228, wire 230, wire 233, wire 219 and wire 220x, the remainder of the circuit being the same as that described above as including the relay 217 and the line lamp 137 in series. The current which now passes through the line lamp is sufficient to light it. When part of the current passes through the contact 229 to the armature 228 the amount of current passing through the relay 217 is greatly reduced so that its armature 223 moves out of engagement with the contact 224 thus opening the circuit through relay 226. The relay 226 is thereby deënergized and its armature 228 moved out of engagement with the contact 229 to extinguish the line lamp. It can be seen from the above description that the relays 217 and 226 are energized and then deënergized one after the other and that each time the relay 226 is energized the line lamp is lighted and each time the relay 226 is deënergized the lamp is extinguished. In this manner the necessary pulsations of current over the circuit including the armature 228 and the line lamp are caused to make the line lamp flash until the credit man inserts his plug 139 into the corresponding line jack.

*Ringing circuit.*

When the credit man wishes to notify the clerk that he is ready to be communicated with he inserts his plug 139 in the line jack below the lighted line lamp and presses the ring key 146. Insertion of the plug moves the contact 155 out of engagement with the contact 154 thereby opening the line signal circuit. Depression of the ring key 146 closes a circuit over which the generator charges two condensers and energizes the electro-magnet of the clerk's receiver, the electromagnet being deënergized when the condensers become fully charged. The energizing and deënergizing of the electro-magnet causes the diaphragm of the latter to click. Mechanical means is provided to establish a short circuit through which the condensers discharge, the mechanical means being constructed to make and break the short circuit with considerable frequency. Each time the short circuit is made the condensers discharge thereby energizing and deënergizing the electro-magnet of the receiver to make the diaphragm click. It can, therefore, be seen that as the diaphragm of the clerk's receiver clicks each time the condensers are charged and each time the condensers discharge the receiver makes a humming noise to attract the clerk's attention.

The circuit through which the generator energizes the electro-magnet of the clerk's receiver is as follows: from the generator through the main positive wire, wire 240x, clerk's telephone set, condenser 243x, wire 242x, contacts 61 and 60, wires 244cd, 244ab, 245b, contact 152, the sleeve of the plug 139, frame 143, wires 246b and 241b, contacts 247 and 248 moved into engagement by depression of the ring key, wire 249b, wire 250, condenser 251, wire 252, inductance 253, wire 254, wire 255b, contacts 256 and 257 also moved into engagement by depression of the ring key, wire 258b and thence through the main negative wire to the generator. The generator over this circuit charges the condensers 243 and 251 and causes the diaphragm of the clerk's receiver to click.

Fast on the armature shaft 260 (Fig. 29) of the generator is a disk 263 having blocks 264 of insulating material embedded in its periphery. When brushes 265 and 266 engage blocks 264 current from the generator passes over the above described circuit. When the blocks 264 move out of engagement with these brushes a short circuit through the disk 263 is completed and the condensers 243x and 251 discharge through this short circuit which is as follows: from the disk 263, brush 266, main positive wire, wire 240x, clerk's telephone set, condenser 243x, wire 242x, contacts 61 and 60, wires 244cd, 244ab, and 245b, contact 152, the sleeve of plug 139, frame 143, wires 246b and 241b, contacts 247 and 248, wire 249b, wire 250, condenser 251, wire 252, through the brush 265 to the disk 263. When the condensers 243x and 251 discharge over this short circuit the electro-magnet of the clerk's telephone receiver is energized and then deënergized whereupon the diaphragm again clicks. From the above description it can be seen that each time brushes 265 and 266 engage blocks 264 and each time the blocks move out of engagement with the brushes the diaphragm clicks so that a humming noise is caused thereby notifying the clerk that the credit man is ready to be communicated with. When the blocks 264 move out of engagement with the brushes 265 and 266 the path of the current from the generator is as follows: from the generator through the main positive wire, brush 266, disk 263, brush 265, inductance 253, wire 254, wire 255b, contacts 256 and 257, wire 258b, through the main positive wire back to the generator. As the inductance 253 offers limited resistance to the constant current but a very large resistance to a varying current, as is well known, the current due to the discharge of the condensers 243x and 251 is prevented from passing through the inductance and therefore through the generator and is compelled to pass through the disk 263. As the condensers 243x and 251 offer a very large resistance to the passage of a constant current but only a slight impedance to the passage of a pulsatory or alternating current, as is well known, the condensers compel the current from the generator to short circuit through the disk 263 when the blocks 264 are not in engagement with the brushes 265 and 266. The resistance of the inductance 253 is large enough to prevent excessive current from the generator from passing through the short circuit closed by the disk 263.

It can be seen that the solenoid 83 of the stamp is in parallel with the clerk's telephone set when the contacts 118 and 119 are in engagement and that if the condenser 251 was not in series the above described circuit from the generator through the condenser 251 and the clerk's telephone set would supply a constant current to the solenoid of the stamp and cause complete or partial operation of the latter. As the condenser 251 prevents the passage of constant current through the solenoid the stamp cannot be operated over this circuit.

By tracing the ring circuits closed through the telephone receiver at clerk's station Y by depression of the ring key 146 at switchboard F it will be evident that these circuits correspond exactly to the corresponding circuits, between clerk's station X and switchboard B, except that the former include contacts 312 and 313 which are normally in engagement and moved out of engagement by depression of the connecting key 149.

*Talking circuits.*

When the clerk lifts her telephone from the hook the contacts 61, 62 and 63 are moved into engagement, as above described, to close a circuit over which the energizing current passes. This circuit is as follows: from the generator through the main positive wire, wire 240x, clerk's telephone set, wire 275x, contacts 62, 61 and 63, wires 276cd, 276ab, 277b, contact 158, point of plug 139, contact 153, wires 278b and 281b, through the telephone set at switchboard B, inductance 283b, wire 279b, thence through the main negative wire to the generator. Inductances 280x and 282b are bridged across the clerk's and credit man's telephone receivers respectively to regulate the amount of current passing through the receivers. The resistance and inductance of a receiver and the appropriate coil 280x or 282b are so proportioned that most of the constant energizing current passes through the coil while most of the vibrating voice current passes through the receiver.

The circuit over which the vibrating voice current passes is as follows: from the clerk's telephone through wire 275x, contacts 62, 61 and 63, wires 276cd, 276ab, 277b, contact 158, point of plug 139, contact 153, wires 278b and 281b, credit man's transmitter and receiver, wire 284b, condenser 285b, wire 286b, wire 204, wire 203, main positive wire and wire 240x back to the clerk's telephone. The inductance 283b offers limited resistance to the energizing current but large resistance to the voice current and the condenser 285b offers a large resistance to the energizing current but a very small resistance to the voice current. Therefore the voice current does not pass through the inductance 283b and the generator and the energizing current does not pass through the condenser 285b. As the inductance 283b prevents the passage of voice currents cross talk between the clerk's stations in one division and the telephone sets of the credit men handling the sales in the other division is prevented, as is well understood.

It will be observed that a retardation coil 288 is in series with the telephone sets and that a condenser 289 is bridged across the line. This condenser and coil are for the purpose of eliminating undesirable noises in the telephone receivers due to the commutation of the generator, as is well understood. The voice current is not affected by the coil 288 as the latter is not in the circuit over which the voice current passes.

The talking circuits between switchboard F and clerk's station Y correspond to those between switchboard B and clerk's station X except that the former includes contacts 320 and 322 which are normally in engagement and are moved out of engagement by depression of the connecting key 149.

Stamp lamp circuit.

When the sales slip to be stamped is inserted into stamping position the contacts 118 and 119 are moved into engagement, as above stated, to close the stamp lamp circuit which is as follows: from the generator through the main positive wire, wire 240x, solenoid 83 of the stamp, contacts 118 and 119, wires 292x, 244cd, 244ab, 245b, contact 152, sleeve of the plug 139, frame 143, wires 246b and 241b, contacts 247 and 290 which are normally in engagement, wire 293b, contacts 294 and 295, stamp lamp 147, wire 296b, through the main negative wire to the generator. The current through this circuit lights the stamp lamp 147 to notify the credit man that the sales slip is in position to be stamped.

As above stated, when the clerk's telephone is on the hook, the contact 61 is in engagement with the contact 60 so that the telephone set and condenser 243x are in parallel with the stamp. It can therefore be seen that if the condenser 243x were not provided the constant current from the generator would pass through the clerk's telephone set and the stamp lamp and light the lamp when the contacts 118 and 119 are not closed. However, as a constant current cannot pass through the condenser the stamp lamp cannot be lighted when the contacts 118 and 119 are not in engagement. Although the stamp 83 is in the above described stamp lamp circuit, yet the resistance of the stamp lamp 147 is so large that the amount of current passing through the stamp 83 is not sufficient to operate the latter.

Stamp circuit.

When the sales slip is in position to be stamped the credit man depresses his stamp key 148 to move the contact 294 out of engagement with the contact 295 and into engagement with the contact 300 and thereby close a circuit which is identical to the stamp lamp circuit, except that the current passes from wire 293b, through contacts 294 and 300, instead of passing from the wire 293b through contacts 294 and 295 and the stamp lamp 147, the stamp lamp now being out of the circuit. As the stamp lamp is not in the stamp circuit the amount of current now passing through the stamp is sufficient to effect its operation.

The condensers 251 and 243x as above stated, are in the ring circuit through which the generator charges the condensers and energizes the electro-magnet of the clerk's receiver. The condenser 243x, without the condenser 251, would serve to make the diaphragm of the telephone receiver hum, as above described. The condenser 251 is also provided, however, to prevent a constant current from passing through the solenoid of the stamp when the contacts 118 and 119 are closed, the clerk's telephone is on the hook and the ring key is depressed, the stamp being in parallel with the clerk's telephone set, as above described. Constant current through the stamp is necessary to its operation and therefore as the condenser 251 prevents the constant current from passing through the stamp when the ring key is depressed the stamp cannot be operated over the ring circuit including the generator.

The stamp lamp and stamp circuits between switch board F and clerk's station Y are like those between switchboard B and clerk's station X except that the former include the contacts 312 and 313.

Circuits with connecting key operated.

When a credit man leaves his switchboard he may depress the connecting key 149 so that the credit man at the other switchboard on the desk may complete the line connections on either switchboard and use but one telephone set and the corresponding ring and stamp keys to communicate with the clerks in either division of the store, ring the clerks and operate the stamps. In the diagrammatic view shown in Fig. 29 the circuits are shown arranged so that the calls received on switchboards E, F, G and H may be handled by the telephone sets and ring and stamp keys at the switchboards A, B, C and D respectively. For the sake of illustration the various circuits between clerk's station Y and switchboard B will be described when the connecting key on desk II is depressed.

It is understood that the signal circuits are not changed by depression of a connecting key as the white line lamps 137 on the switchboard are lighted regardless of whether the connecting key is depressed or not. Therefore, if a clerk at clerk's station Y depresses the $f$ key 40 the corresponding white line lamp on switch board F is lighted.

When the credit man is ready to be communicated with he inserts the plug 139 in the line jack on switchboard F and then depresses the ring key 146 at switchboard B to close a ring circuit which is as follows: from generator through the main positive wire, wire 240*y*, telephone set at clerk's station Y, condenser 243*y*, wire 242*y*, contacts 61 and 60, wires 244*gh*, 244*ef*, 245*f*, contact 152 of line jack *y* at switchboard F, sleeve of plug 139, frame 143, wire 246*f*, contacts 313 and 314 moved into engagement by operation of the connecting key, wire 315*f*, wire 241*b*, contacts 247 and 248, wire 249*b*, wire 250, condenser 251, wire 252, inductance 253, wire 254, wire 255*b*, contacts 256 and 257, wire 258*b*, through main negative wire to the generator. The current over this circuit which is completed when the ring key is depressed and the blocks 264 of the disk 263 are in engagement with the brushes 265 and 266, charges the condensers 243*y* and 251 and energizes the electro-magnet of the clerk's telephone receiver to make it click. Each time the blocks 264 move out of engagement with the brushes 265 and 266 the condensers 243*y* and 251 discharge through the disk 263 thereby causing the clerk's telephone receiver to click. In this manner the depression of the ring key at switchboard B makes the diaphragm of the receiver at the clerk's station Y hum to notify the clerk that the credit man is ready to be communicated with.

When the clerk at clerk's station Y removes the telephone from the hook the following circuit for the energizing current of the telephone line is closed: from the generator through the main positive wire, wire 240*y*, clerk's telephone set at station Y, wire 275*y*, contacts 62, 61 and 63, wire 276*gh*, wire 276*ef*, wire 277*f*, contact 158, point of plug 139, contact 153, wire 278*f*, contacts 320 and 321 moved into engagement by operation of the connecting key, wire 323*f*, wire 281*b*, telephone set at switchboard B, wire 279*b*, through the main negative wire to the generator. The voice current after passing through the telephone set of switchboard B passes through the condenser 285*b*, wires 204, 203 to the main positive wire, as is readily understood.

The stamp lamp circuit with the connecting key depressed is as follows: from the generator, through the main positive wire, wire 240*y*, solenoid 83 of the stamp at clerk's station Y, contacts 118 and 119, wires 292*y*, 244*gh*, 244*ef*, and 245*f*, contact 152, sleeve of the plug 139, frame 143, wire 246*f*, contacts 313 and 314, wire 315*f*, wire 241*b*, contacts 247 and 290, wire 293*b*, contacts 294 and 295, stamp lamp 147 at switchboard B, wire 296*b*, through the main negative wire to the generator. The stamp circuit when the connecting key is depressed is similar to the stamp lamp circuit, above described, except that the current passes from the contact 294 through the contact 300 instead of through the stamp lamp.

It is obvious, of course, that when the connecting key is depressed contacts 320 and 322 and contacts 312 and 313 are moved out of engagement and therefore the stamp and ring keys and the telephone set at switchboard F cannot be used to handle the calls.

*Line signal circuit with transfer key depressed.*

In Fig. 29 the circuits are shown arranged so that the calls ordinarily indicated by the white line lamps 137 on switchboards A and B and on switchboards E and F can be transferred to the switchboards C and G respectively. Therefore when the transfer keys 150 on the switchboards A, B, E and F are moved to transfer position the corresponding white line lamps 137 on switchboards C and G are lighted whenever the clerks attempt to call the credit men ordinarily at switchboards A, B, E or F. It is obvious that if the connecting key at desk III is depressed the credit man at switchboard C can handle all the calls indicated on switchboards C and G by his own telephone set and ring stamp keys. Furthermore, if he answers both the white and red lamps on the switchboards he can also handle the calls ordinarily handled at switchboards D and H.

With the electrical circuits arranged as shown in Fig. 29 the calls ordinarily received on switchboards C, D, G and H cannot be transferred to the other switchboards. However, the line jacks of these switchboards are shown as having the same construction as those of the other switchboards, as in practice it is desirable to make all of the switchboards alike in order that the system may be changed to meet any requirement by merely changing the connecting wiring. With the arrangement of the electric circuits shown in Fig. 29 the transfer keys at switchboards C, D, G and H would be removed.

When a transfer key 150 is moved to transfer position, the contacts 155 of the line jacks at this switchboard are moved out of engagement with the contacts 154, as above described, thereby preventing the line lamps at the switchboard from being lighted, the contacts 154 and 155 being in the line signal and the flash circuits. Operation of the transfer key 150 also moves the contacts 157 of the line jacks into engagement with the contacts 156, as above described.

For the sake of illustration it will be assumed that a clerk at clerk's station X depresses the *b* key 40 and that the transfer key at switchboard B is in transfer position. Depression of the *b* key closes the following line signal circuit: from the generator through the main positive wire, wire 180*x*, contacts 183 and 184, wire 182*x*, contacts 68 and 67 moved into engagement by the *b* key, wires 185*b*, 186*b* and 325*b*, contacts 156 and 157 of line jack *x* at switchboard B, wire 326*b*, wire 327*abc*, wire 328*abc*, wire 329*abc*, wire 186*c*, *x* line lamp 137, wire 187*c*, wire 188*cd*, contacts 155 and 154 of line jack *x* at switchboard C, wire 189*cd*, contacts 154 and 155 of line jack *x* at switchboard D, wire 190*cd*, thence through the main negative wire to the generator. The flash circuits are changed accordingly and need not be traced in detail.

While the form of mechanism herein shown and described, is admirably adapted to fulfil the objects primarily stated, it is to be understood that it is not intended to confine the invention to the one form of embodiment therein disclosed, for it is susceptible of embodiment in various forms all coming within the scope of the claims which follow.

What is claimed is:—

1. In a store system the combination with a marking device, of a plurality of distant signaling devices, means at each signaling device for controlling operation of said marking device, and means at the marking device for selectively controlling operation of the desired signaling device.

2. In a store system the combination with a plurality of marking devices, of a plurality of sets of distant signaling devices, means at each set of signaling devices for controlling operation of any of said marking devices, and means at each marking device for controlling the operation of a signaling device in any desired set.

3. In a store system the combination with a marking device, of a plurality of distant signaling devices, means at each signaling device for controlling operation of the marking device, and a plurality of keys, one for each signaling device, at the marking device for selectively controlling the operation of the desired signaling device.

4. In a store system the combination with a plurality of marking devices, of a plurality of sets of distant signaling devices, means at each set of signaling devices for controlling operation of any of said marking devices, and a plurality of keys at each marking device and one for each set of signaling devices for controlling the operation of a signaling device in any desired set.

5. In a store system the combination with a marking mechanism, of a plurality of distant signaling devices, a switch at each signaling device, actuating circuits closed by said switches for operating said marking mechanism, means at the marking mechanism, and electrical connections controlled by said means for selectively operating the desired signaling device.

6. In a store system the combination with a plurality of marking devices, of a plurality of sets of distant signaling devices, switch means at each set of signaling devices, actuating circuits closed by said switch means for selectively operating said marking devices, means at each marking device, and electrical connections controlled by said means at each marking device for operating a signaling device in any desired set.

7. In a store system the combination with a plurality of marking devices, of a plurality of sets of distant signaling devices, switch means at each set of signaling devices, circuits closed by said switch means for selectively operating any of said marking devices, means at each marking device, circuits selectively closed by said means at a marking device for operating a signaling device in the desired set, and a common source of electrical energy for said marking device circuits and said signaling device circuits.

8. In a store system the combination with a marking device, of a plurality of distant signaling devices, a telephone system including a telephone set at each signaling device and at the marking device, means at each signaling device for controlling operation of said marking device, a plurality of keys, one for each signaling device and at the marking device for selectively controlling the operation of the desired signaling device, means for retaining said keys in operated position, and means for operating said retaining means to release the operated key when talking communication is established.

9. In a store system the combination with a marking device, of a plurality of distant signaling devices, a telephone system including a telephone set at each signaling device and at the marking device, a telephone hook at the marking device, means at each signaling device for controlling operation of said marking device, a plurality of keys one for each signaling device and at the marking device for selectively controlling operation of the desired signaling device, a detent common to said keys for retaining the keys in operated position and operated by the telephone hook, whereby when the telephone at the marking device is removed therefrom, said detent will be operated and thereby release the operated key.

10. In a store system the combination with a plurality of marking mechanisms, of a set of distant signals for each marking mechanism, a device at each signal for controlling the operation of the marking mechanism appropriate to the set, means at each marking mechanism for selectively controlling operation of the desired signal of the appropriate set, and means whereby any marking mechanism may be controlled for operation by a controlling device of a set appropriate to another marking mechanism.

11. In a store system the combination with a plurality of marking mechanisms, of a set of distant signaling means for each marking mechanism, a plurality of sets of devices, one device being at each signaling means, circuits closed by said devices for operating the marking mechanisms appropriate to the sets of devices, means at each marking mechanism, circuits closed by said means at the marking devices for operating the desired signaling means of the appropriate sets, switches at said devices, and means for operating the latter whereby a controlling device of a set may be operated to close a circuit for operating a marking device not appropriate to the set.

12. In a store system the combination with a plurality of marking mechanisms, of a set of distant signaling means appropriate to each marking mechanism, a plurality of sets of devices, one device being at each signaling means, circuits closed by said devices for operating the marking mechanisms appropriate to the sets of devices, means at each marking mechanism, circuits closed by said means at the marking devices for operating the desired signaling means of the appropriate sets, switches, means controlling the same whereby a controlling device of a set may be operated to close a circuit for operating a marking device not appropriate to the set, and a common source of electrical energy for all of said circuits.

13. In a store system the combination with a plurality of clerks' stations, of a marking device at each of said clerks' stations, credit men's stations at a central station, each normally electrically connected with a series of department stations and their marking devices, a circuit closer at each of said credit men's stations each common to all of the department stations and their marking devices appropriate to its appropriate credit man's station, a manipulative device operable to place all of the department stations and their marking devices under the control of one of said credit men's station and circuit closer, and a common source of electrical energy for operating all of said marking devices.

14. In a store system the combination with an electrically operated stamp, of a lamp in circuit with said stamp the circuit being closed by the presence of the slip to be stamped to light the lamp, and means for throwing the lamp out of the circuit to effect operation of the stamp, the resistance of the lamp being sufficient to prevent operation of the stamp when the lamp is in the circuit.

15. In a store system the combination with a telephone system comprising a plurality of clerks' stations and a central station, of a marking device at each clerk's station, a plurality of switchboards at the central station each comprising a set of contacts and a signal for each clerk's station and a device for controlling operation of the marking device at any desired station, means at the clerks' stations for selecting the switchboard at which the corresponding signals are to be operated, and means for operating said sets of contacts of a switchboard so that the signals on another switchboard are operated whenever the means at the clerks' stations are operated to operate the signals on the switchboard on which the sets of contacts have been operated.

16. In a store system the combination with a telephone system comprising a plurality of clerks' stations arranged in divisions and a plurality of switchboards appropriate to each division, a marking device at each clerk's station, a key at each switchboard for controlling operation of the marking devices in the appropriate division, signals on the switchboards, there being one signal for each clerk's station in a division on each of the switchboards appropriate to the division, means at the clerks' stations for selectively controlling operation of the corresponding signal on the desired switchboard, means whereby the key on a switchboard not appropriate to a division of marking devices may be employed to control operation of the latter, and means whereby signals on a switchboard appropriate to a division are operated when the selecting means at the clerks' stations in the division are operated to select for operation signals on another switchboard appropriate to the same division.

In testimony whereof we affix our signatures.

HERBERT G. DORSEY.
ARTHUR C. KIRSHNER.